United States Patent [19]

Kellison

[11] Patent Number: 4,586,846
[45] Date of Patent: May 6, 1986

[54] METHOD AND APPARATUS FOR REBAR AVOIDANCE

[76] Inventor: Roger C. Kellison, 8200 Blvd. E., North Bergen, N.J. 07047

[21] Appl. No.: 655,507

[22] Filed: Sep. 27, 1984

[51] Int. Cl.⁴ ............................................ E01F 13/00
[52] U.S. Cl. ......................................... 404/6; 404/72; 308/4 R; 408/241 G; 408/241 S
[58] Field of Search ..................... 404/6, 72, 134, 135, 404/136; 308/3 R, 4 R; 175/220; 408/241 R, 241 B, 241 G, 241 S, 72 R, 72 B; 52/698

[56] References Cited

U.S. PATENT DOCUMENTS 2,964,115  12/1960  Clatfelter ..................... 175/220 X
3,377,807   4/1968  Nave ............................. 52/698 X

FOREIGN PATENT DOCUMENTS 2080163  2/1982  United Kingdom ........... 408/241 G

OTHER PUBLICATIONS

Drawing from Kelken-Gold, Inc. Literature-May 22, 1983.
"Typical Barrier Details," Kelken-Gold, Inc., advertising literature, undated.
Kelistud Highway Anchor, advertising flyer by Kelken-Gold, Inc., undated.

Primary Examiner—Stephen J. Novosad
Assistant Examiner—John F. Letchford
Attorney, Agent, or Firm—Brumbaugh, Graves, Donohue & Raymond

[57] ABSTRACT

A method for avoiding rebar, a fixture useful to that end, a particular fastener for use with the method and fixture, and objects to be fastened adapted for rebar avoidance. Where rebar is encountered drilling directly into a concrete surface, a fixture is moved into place over the hole. The fixture has an angled bit guide that guides the drill bit at an angle into the concrete, away from the rebar and to the appropriate depth. The fixture is removed, the object to be secured is replaced, the original and the inclined hole are filled with a hardening securing agent, and a special bent-shaft fastener is introduced into the inclined hole. The bend of the fastener is such that its upper end projects substantially perpendicular to the surface just as would have been the case had no rebar been encountered and a conventional fastener used. A road barrier or the like has several alternate routes for a fastener at its connection location. The routes may be separate holes or an inclined path through a conical hole. When rebar is encounter a second route is used to drill a new hole and enter the fastener through the object.

17 Claims, 12 Drawing Figures

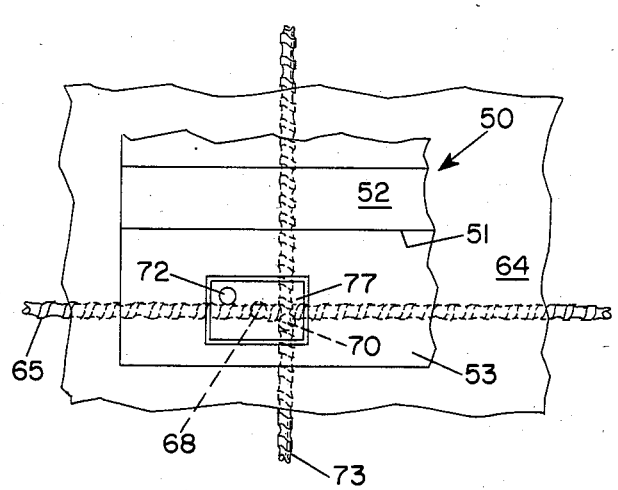
FIG. 9
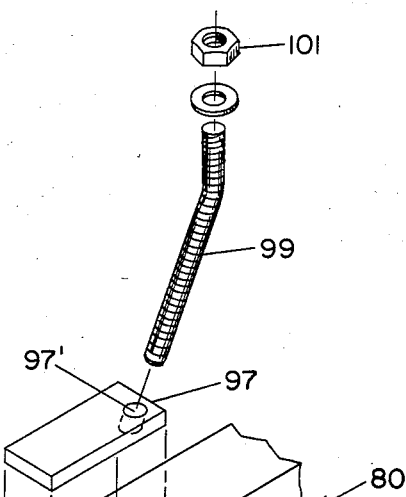
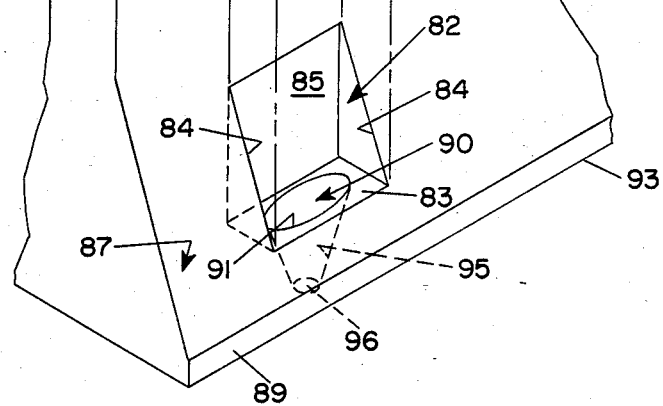
FIG. 10
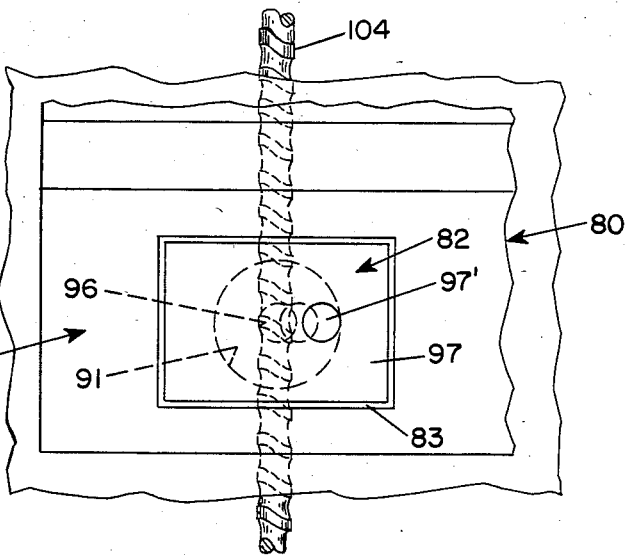
FIG. 12     FIG. 11

1

METHOD AND APPARATUS FOR REBAR AVOIDANCE

BACKGROUND OF THE INVENTION

This invention relates to methods and apparatus for avoiding rebar, which is to say reinforcing bars in concrete structure, when locating fasteners in drilled holes in reinforced concrete structure and to the fasteners for use with the aforesaid methods and apparatus. More particularly the invention relates to a fixture and to fastened objects for routing a drill bit away from rebar encountered in a previous drilling attempt, a method of fastening using that fixture or object, and a bent-shaft fastener for insertion in a rerouted hole.

One of the most troublesome problems on any construction site involves masonry drilling and the reinforcing steel used in concrete. If rebar, the reinforcing rods or bars that extend through concrete structure, is encountered while drilling, the hole must be shifted or the steel rebar must be drilled through. Since the hole often must be at a specific point, diamond bits are used to drill through the rebar at an estimated cost of $10 to $30 per hole rather than the ordinary air drilling that occurs at a cost of an estimated 0.25 to $1.00 per hole. Moreover, the bar has now been severed and the integrity of the concrete structure has been damaged.

SUMMARY OF THE INVENTION

In accordance with this invention a fixture guides the tool bit at an angle away from previously encountered rebar. At the surface the hole location is the same as the previously drilled hole that encountered the reinforcing bar. The fixture includes a mounting plate that rests upon the concrete surface to be drilled and a guide for the drill bit supported on the plate at an angle of inclination. The guide may be rotatable with respect to the plate to permit the drill to be introduced in any direction at the inclined angle away from the reinforcing bar.

Once the inclined hole has been drilled a hardening securing agent is poured into the top of the holes where they come together to fill both holes. The shaft of a fastener is inserted into the inclined hole, missing the rebar without either relocating the point of fastening or cutting the rebar.

A fastener can be specially provided for this purpose, having a shaft bent at an angle that matches the angle of inclination determined by the fixture and slightly longer to enable its being inserted to the same depth as fasteners inserted perpendicular to the concrete surface.

Alternatively, the object to be fastened to the concrete surface can be provided with several fastener routes near its connection location to allow a second and even a third attempt to drill, avoiding the rebar without relocating the object. In that case, the same bent shaft fastener as described above can be employed. A plate with a hole located to accommodate the protruding fastener can then cover the remaining, unused holes in the object.

Similarly, the object may be provided with a fastener hole having inclined sides, conical in shape, for example, to permit inclined drilling into the concrete surface through the hole in the object when vertical drilling has hit rebar. Again, a plate with an offset hole can accommodate the same bent shaft fastener while covering the unused area of the upper, wider hole end.

BRIEF DESCRIPTION OF DRAWINGS

The above and further advantages of the invention will be better understood with respect to the following detailed description and the several views of the accompanying drawings wherein:

FIG. 9 is a fragmentary top plan view of the barrier of FIG. 8 and shows alignment of the reinforcing bar with the central hole at the connection location;

FIG. 10 is a fragmentary perspective view partially in section of another barrier having a conical hole at its connection location;

FIG. 11 is a fragmentary top plan view of the barrier of FIG. 10 and shows the relationship of a plate and conical hole defining a path for an incline fastener avoiding rebar aligned with the hole; and FIG. 12 is a fragmentary elevational view of another barrier alternative with three holes, one vertical and two inclined.

DETAILED DESCRIPTION OF PREFERRED EMBODIMENTS

Figure 1:
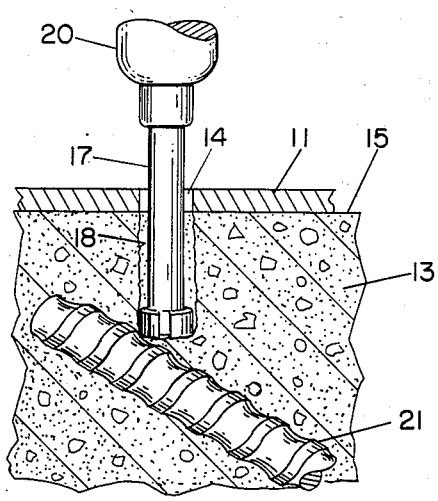
FIG. 1 is a fragmentary cross-sectional view of a masonry drill encountering rebar in concrete structure.

In FIG. 1 an object 11 to be secured to a concrete structure 13 has an opening 14 to receive a fastener for securing the object to the upper surface 15 of the concrete structure 13. In the Figure, a masonry drill bit 17 has formed a hole 18 below the opening 14 in the plate-like object 11. Driven by a drill 20, the bit 17 has encountered rebar 21. Conventionally, at this point, either the object 11 must be moved to a new location so that a new hole can be drilled and the rebar avoided, or an expensive diamond bit must be used to partially or completely sever the rebar to complete the hole 18.

Figure 2:
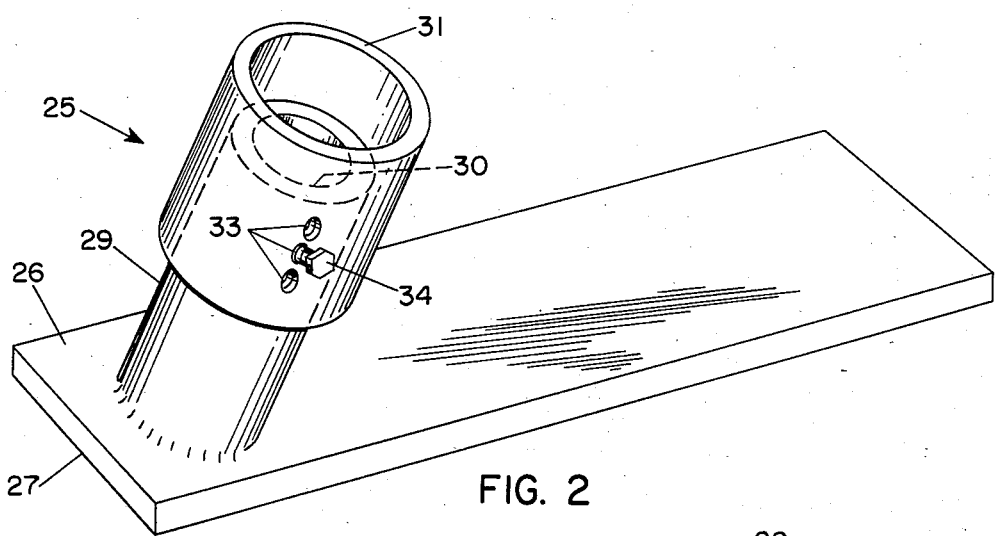
FIG. 2 is a perspective view of a fixture for guiding a masonry drill bit at an angle away from rebar.

A fixture 25 in FIG. 2 includes a support member or plate 26. This has a lower surface 27 to rest on the upper surface 15 of the concrete structure 13. A bit guide 29 is secured to the support plate 26. An inclined central opening 30 extends through the bit guide 29 and the support plate 26. The guide 29 is inclined from the perpendicular by an angle of 20° so as to guide the bit at an angle that departs 20° from perpendicular to the concrete surface 15. The guide can be welded to the plate 26 as indicated. Rotation of the fixture to a desired position permits introduction of the bit along the 20° angle in any desired direction to avoid the encountered obstacle. Alternatively, albeit at more expense, the guide can be rotatably secured to the support plate. Then the workman can adjust the direction as he inserts the drill 17 and gets ready to begin drilling.

At its upper end, the guide 29 terminates in a collar 31 designed to encounter the drill 20 and terminate drilling at the correct depth. Depth adjustment is available through a series of threaded holes 33 in the collar and a screw 34 seen in FIGS. 2 and 3. The screw 34 enters a further threaded hole 35 in the guide 29. The collar can be raised or lowered to effect the depth of the hole by introducing the screw 34 through a lower or higher hole 33 as desired.

Figure 3:
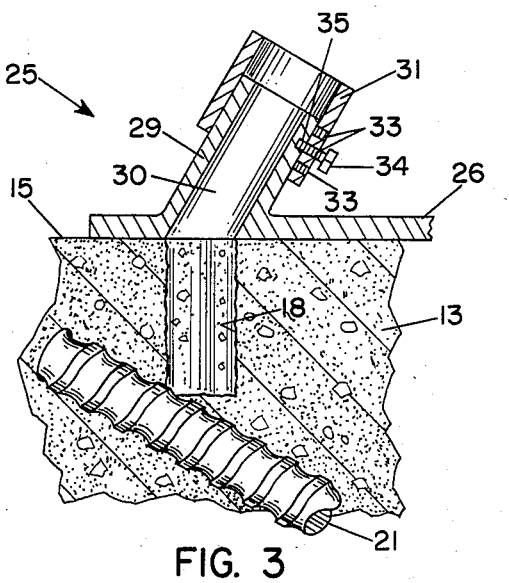
FIG. 3 is a fragmentary cross-sectional view like that of FIG. 1 and shows the fixture in place above the previously drilled hole.
Figure 4:
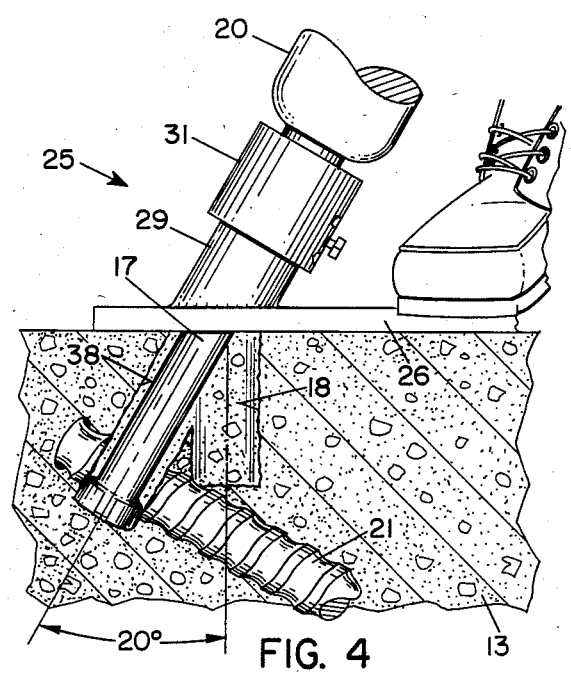
FIG. 4 is a fragmentary cross-sectional view like that of FIGS. 1 and 3 and shows the masonry drill forming an inclined hole.

As illustrated in FIG. 3, the fixture 25 is brought into place over the previously drilled hole 18 until the lower end 32 of the opening 30 aligns with the top of the hole 18. While standing on the plate 26 (FIG. 4), the installer inserts the bit through the collar and guide and drills the correctly angled, proper depth hole in the concrete avoiding the rebar. By virtue of the presence of the collar 31 and guide 29, as well as the inclination of the hole 38, an adapter between the bit 38 and the chuck of the drill 20 may be needed to extend the bit for proper depth.

Figure 6:
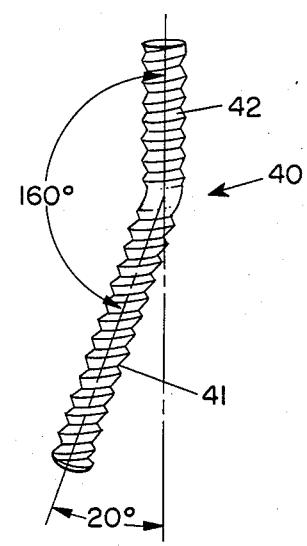
FIG. 6 is a perspective view of a fastener suitable for use with the fixture of FIG. 2.
Figure 5:
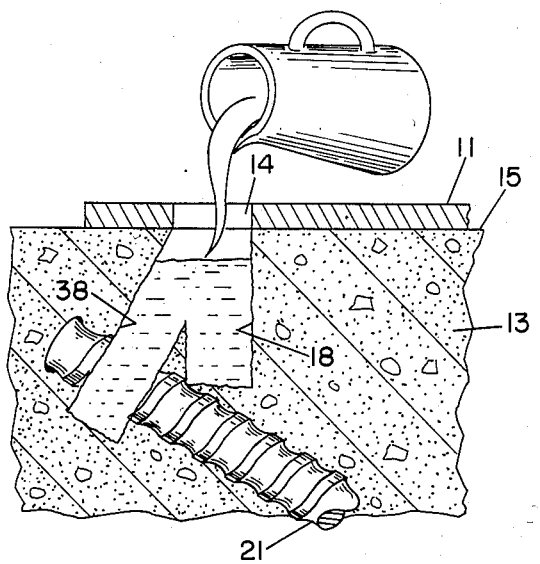
FIG. 5 is another fragmentary cross-sectional view illustrating the step of filling the hole with hardening securing agent.
Figure 7:
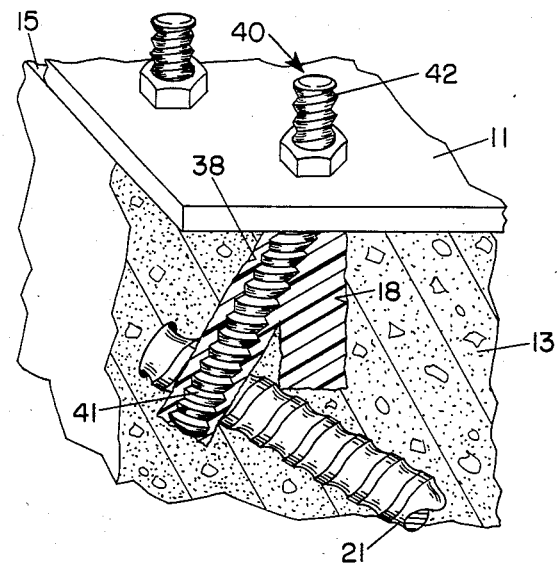
FIG. 7 is a perspective view, with parts broken away and shown in section, and illustrates an object secured by the fastener of FIG. 6 and by conventional fasteners introduced perpendicularly.

The workman removes the fixture 25, replaces the object 11 to be secured, and fills both holes with a hardening securing agent (FIG. 5). A special bent-shaft fastener 40 (FIG. 6) has a longer threaded or otherwise roughened lower end 41 and a shorter threaded upper end 42. The lower end is bent at an angle of 20° with respect to the axis of the upper end. As in FIG. 7, the workman inserts the longer lower end into the freshly drilled and securing agentfilled inclined hole 38 and adjusts the fastener's rotational position until the projecting upper end 42 is substantially perpendicular to the concrete surface, again as displayed in FIG. 7. The securing agent hardens around the fastener 40, and the workman drops appropriate washers or the like in place and tightens down a conventional nut. The location and appearance of the fastener is the same as originally intended and as though rebar had not been encountered. There has been no need to relocate the object nor has the rebar been destroyed.

Figure 8:
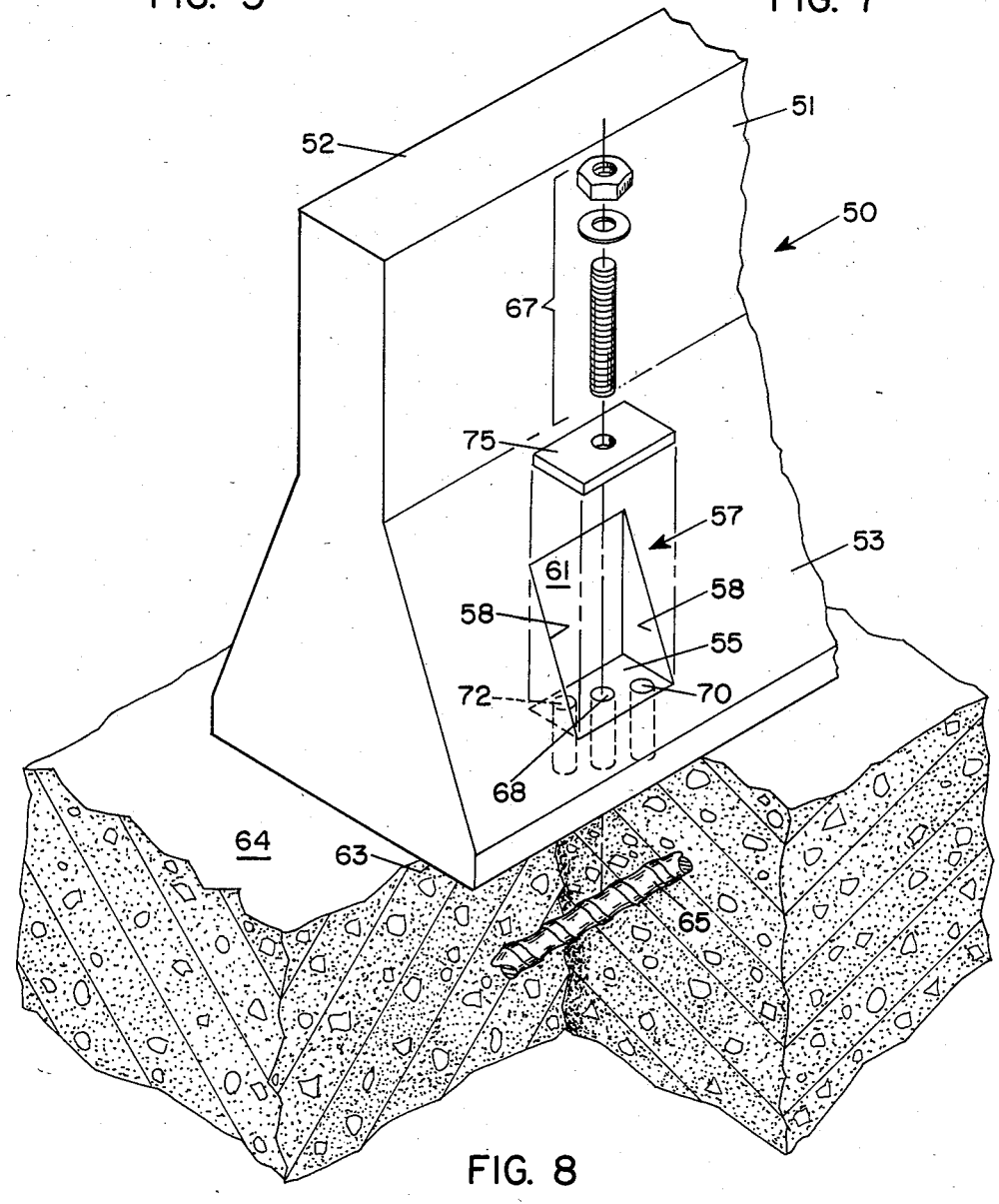
FIG. 8 is a fragmentary perspective view partially in section of a highway barrier with three closely spaced holes at a connection location.

In FIG. 8 a cast concrete highway barrier 50 has the typical shape, with a generally upstanding upper portion 51 terminating in an upper surface 52, and below that, meeting an inclined base portion 53 and a vertical lower edge portion. For bolting in place, several horizontal surfaces 55, only one of which is shown in FIG. 8, are defined along the length of the barrier 50 on each side thereof. The surface 55 is provided by a recess 57 in the surface of the inclined base portion 53. The recess 57 also defining end surfaces 58 and a vertical inner surface 61. A barrier bottom surface 63 rests upon a road surface 64, again, all of which is typical of the prior art. Rebar 65 is seen below the road surface 64 in a location interfering with the use of a fastener 67 in association with a central mounting hole 68 formed in the barrier from the surface 55 in the recess 57 to the under surface 63. Typically, barriers like the barrier 50 are installed either temporarily or permanently to divide highway traffic lanes or to separate new construction from traffic lanes, and there is little opportunity to relocate the barrier when rebar prevents its fastening at one or more of the locations defined by a recess 57 and a central opening 68.

In the barrier 50 of FIG. 8, two further openings 70 and 72 permit a fresh hole to be drilled that would avoid the rebar 65. The holes 72, 68 and 70 are diagonally disposed with respect to the longitudinal axis of the barrier 50 and their spacing both transversely and longitudinally of the barrier is greater than standard rebar thickness to assure avoidance. Even if a second reinforcing bar is encountered with a second hole, for example, where a second bar 73 crosses the bar 65 as shown in FIG. 9, a third hole can be drilled using the remaining of the holes 70 and 72 and that third hole is virtually certain to avoid rebar. A plate 75 (FIG. 8) is employed to close off the tops of the holes 70 and 72 where no rebar is encountered and the central hole 68 is used to secure the barrier 50 by the fastener 67. A plate 77, shown in FIG. 9, is used where the central hole 68 was in alignment with rebar and had to be avoided. The plate 77 can be turned to accommodate either the hole 70 or the hole 72.

In FIG. 10, a barrier 80, similar to the barrier 50 of FIGS. 8 and 9, has a mounting recess 82 defining a bottom surface 83, side surfaces 84, and a back surface 85. The recess 82 is formed in the inclined surface 87 of the barrier 80 just above vertical side surfaces 89. Again several of these along the length of the barrier on each side thereof would be consistent with prior practices. Only a single opening 90 extends from the upper surface 83 of the recess 82 to an under surface 93 which is to rest on the road surface. The hole 90, however, is conical, having a wide upper mouth 91 and inclined sides 95 tapering downward to a much smaller lower opening 96.

Initially, a workman, using a masonary bit, drills vertically downward to the prescribed depth. In most cases, where no reinforcing bar is encountered, a plate like the plate 75 of FIG. 8 is slipped over the wide upper mouth of the hole 90, and a fastener like the fastener 67 of FIG. 8 is put in place. However, where rebar is encountered, the workman directs the drill at an angle of inclination along an inclined side surface 95 of the hole to avoid the bar. Then a plate 97 with an inclined offset hole 97' is dropped in place to close off the unused area of the enlarged mouth of the hole 90, as best seen in FIG. 11. A bent shaft fastener 99 like that described with respect to FIGS. 1-7, a suitable washer and a nut 101 (FIG. 10) are tightened in place. As seen in FIG. 11, the upper end of the fastener 99 projects vertically while its lower end is inclined to avoid rebar 104. It will be appreciated that if the plate 97 is square or is sufficiently smaller than the surface 83 so that it can be positioned in one of four positions, then the workman has four choices as to how to incline his drill bit. Other variations can afford the workman's use of the full range of positions afforded by the hole 90. For example, a circular washer-like plate with an offset hole can be used to cover the enlarged mouth of the hole 90. In all of the embodiments of FIGS. 8-11, a hardening securing agent preferably is poured through the appropriate hole in the barrier, and the fastener 67 or 99 is inserted into the securing agent filled hole. As in the embodiment of FIGS. 1-7, both of the unused and the ultimately used holes can be filled with this securing agent.

Further variations in the rebar avoidance provisions for an object to be secured to concrete structure will be apparent to those skilled in the art. One such is shown in FIG. 12. Again, a barrier 105 has a fastening location 107 defining a back surface 108, a bottom, generally horizontal surface 109, and side surfaces 111. A single vertical hole 115 communicates between the surface 109 and a lower road engaging surface 117 of the barrier 105. At least two further inclined holes 118 and 119 communicate between the surface 109 and the lower surface 117, their lower ends coinciding with the lower end of the hole 115. If rebar is encountered drilling into the road surface via the hole 115, the workman can choose the inclined holes 118 or 119 to avoid the rebar. The inclined holes can be more than two in number, if desired, and it may be that two further holes inclined transversely of the barrier would be preferred for those situations where rebar that prevents fastening through the first hole 115 is disposed longitudinally of the barrier and would still prevent fastening through the inclined holes 118 and 119. A plate either closes the inclined holes and permits central access through the hole 115 or permits access through just one of the inclined holes 118 or 119.

The hardening securing agent can be a two-part cement consisting of viscous, liquid, peroxide-cured, resinous material and a peroxide curing agent formed as a flowable powder, easily measured to the appropriate predetermined amount to permit simplified mixing of the correct proportions of the curing agent and liquid hardenable resinous cement. A two-part resinous cement suitable for this use is commercially available Mastico Adhesive from A&P Foglia, 14 Hickory Drive, East Brunswick, N.J., and another is Kelibond available from Kelken-Gold, Inc., P.O. Box 336T, Hazlet, N.J.

Variations in the details of the above-described preferred embodiment will be apparent to persons skilled in the art and will not depart from the spirit and scope of the invention as set out in the appended claims. For example, any of a number of means for mounting the bit guide rotatably with respect to the support plate may be employed, angles other than the preferred 20° incline may suffice, and it may be that the fixture can be simplified by elimination of the collar, if desired. The fastener itself may employ various features for insulation and water proofing, and may be release agent coated for subsequent removal, if desired.

I claim:

1. A reinforcing bar avoidance fixture for use in drilling into concrete structure reinforced with reinforcing bars and for routing a drill bit away from a reinforcing bar encountered in a first attempt to drill, the fixture including a support means with a lower surface for resting on a surface of the concrete structure over a hole made during the first attempt to drill, bit guide means supported by the support means and having an opening therethrough inclined at an angle other than 90° with respect to the lower surface of the support means and adapted to receive and guide a bit therethrough into the concrete structure and past a reinforcing bar at the angle other than 90° with respect to the surface of the concrete structure, the bit guide means terminating in an enlarged collar for engagement by a power tool driving the guided bit, the collar being adjustably fixed on the bit guide means with respect to its distance from the support means to adjust the depth of the inclined hole.

2. In an object to be fastened to reinforced concrete structure and having a connection location adapted to receive a fastener therethrough and into fastening relation to the concrete structure, the improvement comprising the combination of a hole through the object at the connection location for introducing a fastener through the object to the concrete structure in a first direction and means at the connection location defining an alternate route through the object to the concrete structure to permit the passage of the fastener through the object to avoid obstruction encountered in the first direction.

3. The improvement according to claim 2 wherein the means defining an alternate route comprises at least one further hole through the object at the connection location.

4. The improvement according to claim 3 wherein the further hole is entirely separate from the first mentioned hole and is displaced diagonally thereof so as to have a lateral and longitudinal displacement greater than ordinary rebar width.

5. The improvement according to claim 3 wherein the object is a road barrier, said connection location is defined by a recess in an inclined surface thereon and defines a substantially horizontal surface, and the first mentioned and further holes communicate between the substantially horizontal surface and an under surface of the barrier.

6. The improvement according to claim 5 wherein the further hole is substantially parallel the first hole.

7. The improvement according to claim 5 further comprising means for closing off the first mentioned hole when a fastener is directed through the further hole.

8. The improvement according to claim 7 wherein the means for closing off comprises a plate having an offcenter hole therethrough.

9. The improvement according to claim 2 wherein the means defining an alternate route through the object includes inclined means for accommodating introduction of the fastener through the object at an angle of inclination with respect to a first direction through the hole.

10. The improvement according to claim 9 wherein the inclined means comprises inclined hole sides.

11. The improvement according to claim 10 wherein the hole is conical in shape.

12. The improvement according to claim 10 wherein the object is a road barrier, said connection location is defined by a recess in an inclined surface thereon and defines a substantially horizontal surface, and the first mentioned hole and inclined hole sides communicate between the substantially horizontal surface and an under surface of the barrier.

13. The improvement according to claim 10 further comprising means for closing off unused access at the side of the connection location remote from the concrete surface.

14. The improvement according to claim 13 wherein the means for closing off comprises a plate having an offcenter hole therethrough.

15. A method of fastening an object to reinforced concrete structure comprising providing an object with a connection location defined thereon having a first fastener hole through the object to a surface of the concrete structure, and at least a second route through the object for a fastener at the connection location, bringing the object into place on the surface of the structure, drilling a hole through the first mentioned fastener hole, terminating drilling when a reinforcing bar in the structure is encountered, drilling into the surface in the structure in a direction to continue the second route through the object and past the reinforcing bar, and entering a fastener through the second route into the structure past the reinforcing bar to secure the object to the structure at the connection location.

16. A method of securing a fastener to concrete structure reinforced by reinforcing bars to avoid a reinforcing bar encountered in drilling a hole into the structure, the method including the steps of:
providing a drill routing fixture having a support for resting on a surface of the concrete structure and a drill bit guide supported thereon for guiding a drill at an angle of inclination other than 90° with respect to the concrete structure surface,
locating the routing fixture on the concrete structure surface to guide a drill bit to the previously drilled surface location,
introducing a drill bit through the routing fixture to form in the surface an inclined hole at an angle inclining downward and away from the hole previously drilled in the structure,
removing the drill and the routing fixture, providing a fastener having an elongate shaft with a bend therein, the bend being at an angle substantially matching the angle of inclination of the inclined hole away from the hole previously drilled, and
inserting the shaft of the fastener into the inclined hole.

17. The method according to claim 16 wherein the step of inserting the shaft includes positioning the shaft to situate a portion of the fastener outward of the bend at substantially a 90° angle with respect to the surface of the concrete structure.

* * * * *